US012673621B2

(12) United States Patent
Luo et al.

(10) Patent No.: US 12,673,621 B2
(45) Date of Patent: Jul. 7, 2026

(54) SHOCK-ABSORPTION HEAD AND SHOCK-ABSORPTION MECHANISM

(71) Applicant: TILTA INC., Burbank, CA (US)

(72) Inventors: Yaolong Luo, Shenzhen (CN); Yiling Wang, Shenzhen (CN); Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 143 days.

(21) Appl. No.: 18/650,674

(22) Filed: Apr. 30, 2024

(65) Prior Publication Data

US 2025/0100463 A1     Mar. 27, 2025

(30) Foreign Application Priority Data

Sep. 21, 2023   (CN) .......................... 202311231393.2

(51) Int. Cl.
*B60R 11/04*     (2006.01)
*F16F 15/02*     (2006.01)

(52) U.S. Cl.
CPC .............. *B60R 11/04* (2013.01); *F16F 15/02* (2013.01)

(58) Field of Classification Search
CPC .... B60R 11/04; G03B 17/561; F16F 15/0232; F16F 15/022
See application file for complete search history.

(56) References Cited

U.S. PATENT DOCUMENTS

| | | | | |
|---|---|---|---|---|
| 4,208,028 A | * | 6/1980 | Brown ................... | G03B 13/00 |
| | | | | 396/421 |
| 4,614,943 A | * | 9/1986 | Boucher ................. | B60R 11/04 |
| | | | | 396/419 |
| 7,137,747 B2 | * | 11/2006 | Chapman ............... | F16M 11/42 |
| | | | | 396/428 |
| 8,077,212 B2 | * | 12/2011 | Chapman .............. | B66F 11/048 |
| | | | | 396/419 |
| 8,882,088 B2 | * | 11/2014 | Chapman .............. | F16F 15/022 |
| | | | | 267/141 |
| 11,474,418 B2 | * | 10/2022 | Zeng ...................... | F16M 11/24 |
| 2024/0085767 A1 | * | 3/2024 | Zeng ...................... | F16M 11/00 |
| 2024/0181971 A1 | * | 6/2024 | Zeng ...................... | B66C 23/36 |
| 2025/0102106 A1 | * | 3/2025 | Luo ........................ | F16F 15/03 |
| 2025/0102889 A1 | * | 3/2025 | Luo ...................... | G03B 17/561 |

FOREIGN PATENT DOCUMENTS

| | | | | |
|---|---|---|---|---|
| CN | 212672896 U | 3/2021 | | |
| CN | 113048189 A | 6/2021 | | |
| CN | 214700041 U | * 11/2021 | ............. | F16M 11/18 |
| CN | 218063235 U | * 12/2022 | | |

* cited by examiner

*Primary Examiner* — Bradley Duckworth
(74) *Attorney, Agent, or Firm* — LOZA & LOZA, LLP; Derek W. Yeung

(57) ABSTRACT

A shock-absorption head includes a connector, a moving component, a supporting component, and a shock-absorption structure. The shock-absorption head can induce a swaying motion in the supporting component, counteracting any tendency of a camera to swing. This motion, facilitated by the shock-absorption structure's telescopic movement, effectively mitigates the centrifugal force resulting from the camera's oscillation. The shock-absorption head can minimize the risk of detachment between the camera and the shock-absorption arm, thereby preventing camera instability and ensuring the steadiness of the captured image.

11 Claims, 6 Drawing Sheets

SHOCK-ABSORPTION HEAD AND SHOCK-ABSORPTION MECHANISM

CROSS-REFERENCE TO RELATED APPLICATIONS

The present application for patent claims priority to and the benefit of pending Chinese Application No. 2023112313932, filed Sep. 21, 2023, and hereby expressly incorporated by reference herein as if fully set forth below in its entirety and for all applicable purposes.

TECHNICAL FIELD

The present disclosure belongs to the field of shock absorption technology tailored for devices like vehicle-mounted cameras, in particular to a shock-absorption head and shock-absorption mechanism.

INTRODUCTION

In the realm of capturing dynamic scenes with vehicle-mounted filming devices, whether in indoor or outdoor settings, the utilization of auxiliary tools such as vehicle-mounted camera support structures is commonplace. These structures, employed for filming moving vehicles or similar scenarios, secure the camera to the vehicle, ensuring precise synchronization with the filming scene. Nevertheless, the variable conditions of the road surface can introduce perturbations or shaking to both the camera and the vehicle-mounted support structure, resulting in undesired motion-induced camera shaking during filming. To address this challenge and ensure stable footage, damping mechanisms, exemplified by damping arms, are typically integrated into camera installations. Conventional damping arms typically feature shock-absorption springs affixed to the main body of the damping arm. The head of the damping arm is linked to camera connectors, which securely fasten the camera. The overall structure undergoes buffering and damping through the utilization of these shock-absorption springs.

As detailed in a prior patent application of a damping head, vehicle-mounted damping arm, and vehicle-mounted filming device bearing the application number CN202110273411.8, the damping head comprises an external structure, a buffering component, and a connector. The buffering component incorporates at least one first slider and a second slider, both arranged in parallel with a vertical orientation. Each slider is equipped with two elastic components. The external structure smoothly slides onto the second slider, clamping between the two elastic components of the second slider. The second slider then seamlessly slides onto the first slider, clamping between the two elastic components of the first slider. The connector is rigidly affixed to the buffering component and serves for the attachment of external photographic accessories. In this patent, the elastic components are realized through springs. As the gimbal moves along the direction parallel to the first slider or the second slider, the springs undergo compression or extension, effectively slowing down the lateral or longitudinal movements of the camera mounted on the gimbal, thereby achieving effective shock absorption.

However, it is discernible from the aforementioned description that the existing damping arm structure, relying on shock-absorption springs, faces challenges during the filming process, especially concerning camera shaking and lateral inertia. These challenges pose difficulties in maintaining precise control over the camera's stability and preventing detachment at the head of the damping arm.

BRIEF SUMMARY

To address the aforementioned challenges, the primary objective of the present disclosure is to introduce a shock-absorption head and a shock-absorption mechanism meticulously designed to mitigate the centrifugal force induced by the swinging tendency of the camera. This is accomplished through the autonomous extend-retract actuation of the supporting component, facilitating controlled oscillations in both lateral and longitudinal directions, thereby preventing detachment between the camera and the damping arm. Furthermore, the invention aims to eradicate camera jitter and guarantee the utmost stability in the captured footage.

To achieve the above purpose, the technical solution of the present disclosure is as follows:

The present disclosure introduces a shock-absorption head, comprising a connector, a moving member, a supporting member, and a shock-absorption structure. The shock-absorption structure connected to both the connector and the moving member movably. One end of the moving member links to the connector movably, while the other extends to the supporting member in the same manner. The end of the shock-absorption structure, opposite the connector, attaches to the supporting member movably. In this application, the supporting member is primarily designed for accommodating equipment like cameras that necessitate shock absorption. The shock-absorption head securely attaches to external structures such as a car rig via the connector. The shock-absorption structure is adept at inducing controlled back-and-forth or left-and-right swings in the supporting member, equipped with rotational buffering and shock-absorption functions. The movable component allows for movable connections between the connector and the supporting member. This design guarantees the structural stability of the supporting member while allowing unrestricted and undisturbed movement of it. During shooting, when the camera undergoes horizontal shaking and inertial shifts, the shock-absorption structure autonomously adjusts its position, consequently driving the synchronized swinging of the supporting member and the camera. This motion effectively mitigates the centrifugal force resulting from the camera's oscillation. Consequently, the disclosure minimizes the risk of detachment between the camera and the shock-absorption arm, thereby preventing camera instability and ensuring the steadiness of the captured image.

Furthermore, the shock-absorption structure comprises a shock-absorption component and a transmission component; the shock-absorption component is affixed at a first end to the connector, with a second end movably linked to the transmission component; an end of the transmission component, away from the shock-absorption component, establishes a movable connection with the supporting member; an end of the moving member, away from the supporting member, establishes a mobile connection with the transmission component. The shock-absorption component, integral to this application, is transmitted through the transmission component, indirectly propelling the supporting member, augmenting the overall structural stability.

Furthermore, the connector features a connecting arm equipped with a moving position; the moving member is positioned on the moving position, while the transmission component is situated along a side wall of the moving position; the transmission component, the side wall of the moving position, and the moving member are all coaxially and movably interconnected. This design facilitates synchronous rotation of the moving member and the transmission component during shock-absorption operation. This synchronized movement effectively propels the swinging motion of the supporting member, enhancing the overall structural stability.

Furthermore, the shock-absorption component comprises a shock-absorption body and a telescopic part. The shock-absorption body is securely fixed on the side wall of the connector, with one end of the telescopic part establishing a movable connection to the transmission component, and the other end being movably arranged within the shock-absorption body.

Furthermore, the shock-absorption body is composed of a shock-absorption fixing member and a shock-absorption guide sleeve. The shock-absorption guide sleeve is affixed to the side wall of the connector via the shock-absorption fixing member. The telescopic part, at one end, establishes a movable connection with the transmission component, while the other end is dynamically arranged inside the shock-absorption guide sleeve. In this application, in response to the horizontal shaking and inertial movements of the camera during shooting, inducing a swinging motion, the telescopic part extends or retracts within the shock-absorption guide sleeve. This action, in turn, pulls or pushes the output end of the transmission component, driving the controlled movement of the supporting member. The result is effective cushioning against the centrifugal force generated by the swinging camera, thereby upholding the stability of the shooting frame.

Furthermore, the transmission component comprises a first transmission member and a second transmission member; a first end of the first transmission member being connected to a first end of the telescopic part, while a second end of the first transmission member being movably connected to a first end of the second transmission member; a second end of the second transmission member being movably linked to the supporting member; a midpoint of the first transmission member establishes a rotatable connection with both the moving member and the connector.

Furthermore, the shock-absorption head further comprises a moving shaft, the moving shaft featuring a first shaft part and a second shaft part; the moving member is equipped with a first rotating shaft seat, and the supporting member includes a second rotating shaft seat; the first shaft part being movably connected to the first rotating shaft seat, and the second shaft part being movably connected to the second rotating shaft seat.

Furthermore, the shock-absorption structure incorporates multiple units. two shock-absorption structures are configured on both sides of the connector; and the moving member and the moving shaft are located between the two shock-absorption structures.

Furthermore, a mounting base being arranged on each side of the supporting member, a pivot shaft being configured on the mounting base; and the pivot shaft being movably connected to the two shock-absorption structure, with the second rotating shaft seat aligning along an axis between two mounting bases. In this application, the shock-absorption structure employs two groups of shock-absorption structures on either side of the connecting arm, which can be extended or retracted to push or pull the transmission component. Retracting both structures will pull the transmission component backward, while extending both structures will push it forward. When extending or retracting simultaneously, both structures pull or push the transmission component, which drives the supporting member to swing back and forth, buffering the centrifugal force caused by the camera's fore-and-aft movement. When the two structures stretch and contract alternately, they pull or push the transmission component alternately to drive the supporting member to swing left and right, buffering the left-right centrifugal force caused by the camera's shaking. The supporting member's horizontal plane swings back and forth through the cooperation of pulling or thrust forces from both parts. This buffers camera shaking at any angle, ensuring stable camera shots.

This present disclosure also provides a shock-absorption mechanism using the shock-absorption head. The mechanism comprises a base, a cushioning component, a damping component, a shock-absorption arm, and the shock-absorption head; a first end of the shock-absorption arm being connected to the connector, and a second end of the shock-absorption arm being movably connected to the base; the damping component, located on the shock-absorption arm, and the damping component being movably connected to the cushioning component; an end of the cushioning component, away from the damping component, establishes a rotatable connection with the base.

Furthermore, the device has two shock-absorption arms arranged side by side, each connected to the end of a connecting arm at the front end. Two shock-absorption components are fixedly connected to the outer sides of the shock-absorption arms for added stability.

Furthermore, the cushioning component comprises a first connecting rod and a second connecting rod; the damping component comprises a damping telescopic shaft and a damping guide sleeve; the first connecting rod is movably connected to the base at a first end and movably connected to a first end of the second connecting rod at a second end; a second end of the second connecting rod establishes a movable connection with an output end of the damping telescopic shaft; an end of the damping telescopic shaft away from the second connecting rod being configured within the damping guide sleeve; an end of the damping guide sleeve away from the second connecting rod being connected to a bottom of an end of the shock-absorption arm. In this application, the damping telescopic shaft within the damping guide sleeve, coupled with the rotation of the buffer component, enables length adjustments for improved stability during arm rotation. Specifically, when the shock-absorption arm rotates up and down relative to the base, the telescopic shaft of the damper can drive the second connecting rod to rotate through its own telescoping. This, in turn, drives the first connecting rod to rotate through the second connecting rod, thereby adjusting the shaking and impact force caused by the rotation of the shock-absorption arm and improving its stability.

Additionally, the folded structure of the second connecting rod, securely fixed to the shock-absorption arm, further enhances the overall stability of the structure by connecting the second connecting rod with the shock-absorption arm.

A key advantage compared with the prior art lies in the ability of this shock-absorption head to induce a swaying motion in the supporting member, counteracting any tendency to swing. This motion, facilitated by the shock-absorption structure's telescopic movement, effectively mitigates the centrifugal force resulting from the camera's oscillation. Consequently, the disclosure minimizes the risk of detachment between the camera and the shock-absorption arm, thereby preventing camera instability and ensuring the steadiness of the captured image.

NUMBERING EXPLANATION

1. Shock-absorption head, 2. Base, 3. Cushioning component, 4. Damping component.

11. Connector, 12. Moving member, 13. Supporting member, 10. Shock-absorption structure, 100. First shock-absorption structure, 200. Second shock-absorption structure, 14. First shock-absorption component, 15. First transmission component, 16. Second shock-absorption component, 17. Second transmission component, 18. Cross-axle.

111. Connecting arm, 112. shock-absorption arm, 113. Moving position, 121. First rotating shaft seat, 131. Second rotating shaft seat, 132. Mounting seat, 141. First shock-absorption fixing part, 142. First shock-absorption guide sleeve, 143. First telescopic part, 151. First rotating triangle piece, 152. First transmission rod, 161. Second shock-absorption fixing part, 162. Second shock-absorption guide sleeve, 163. Second telescopic part, 171. Second rotating triangle piece, 172. Second transmission rod.

31. First connecting rod, 32. Second connecting rod, 41. Damping telescopic shaft, 42. Damping guide sleeve.

DETAILED DESCRIPTION

To elucidate the purpose, technical solution, and aspects of the present disclosure, a detailed description is presented in conjunction with the accompanying drawings and embodiments. It is important to note that the specific embodiments outlined herein are intended solely for explanatory purposes and do not serve to limit the scope of the present disclosure.

Figure 1:
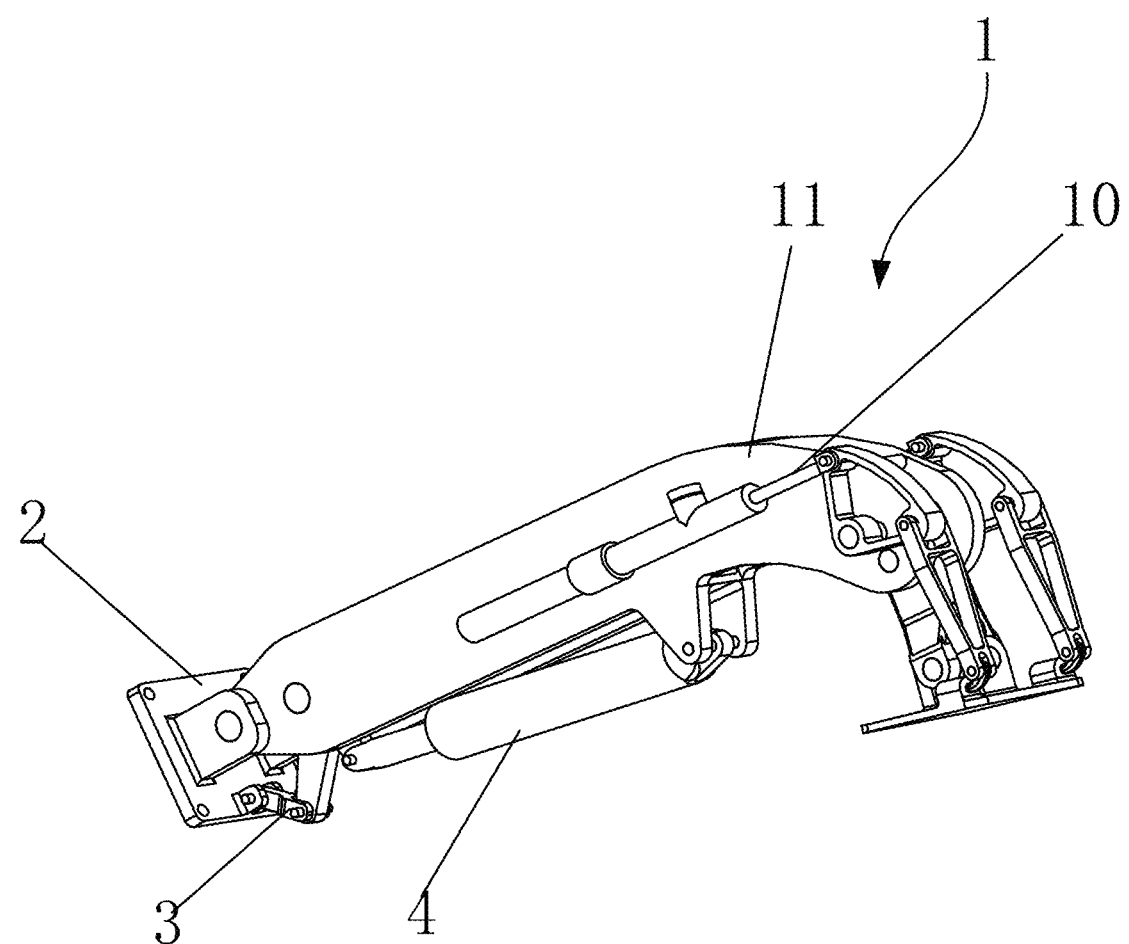
FIG. 1 is an axonometric view from a first perspective of a shock-absorption mechanism according to one embodiment.
Figure 2:
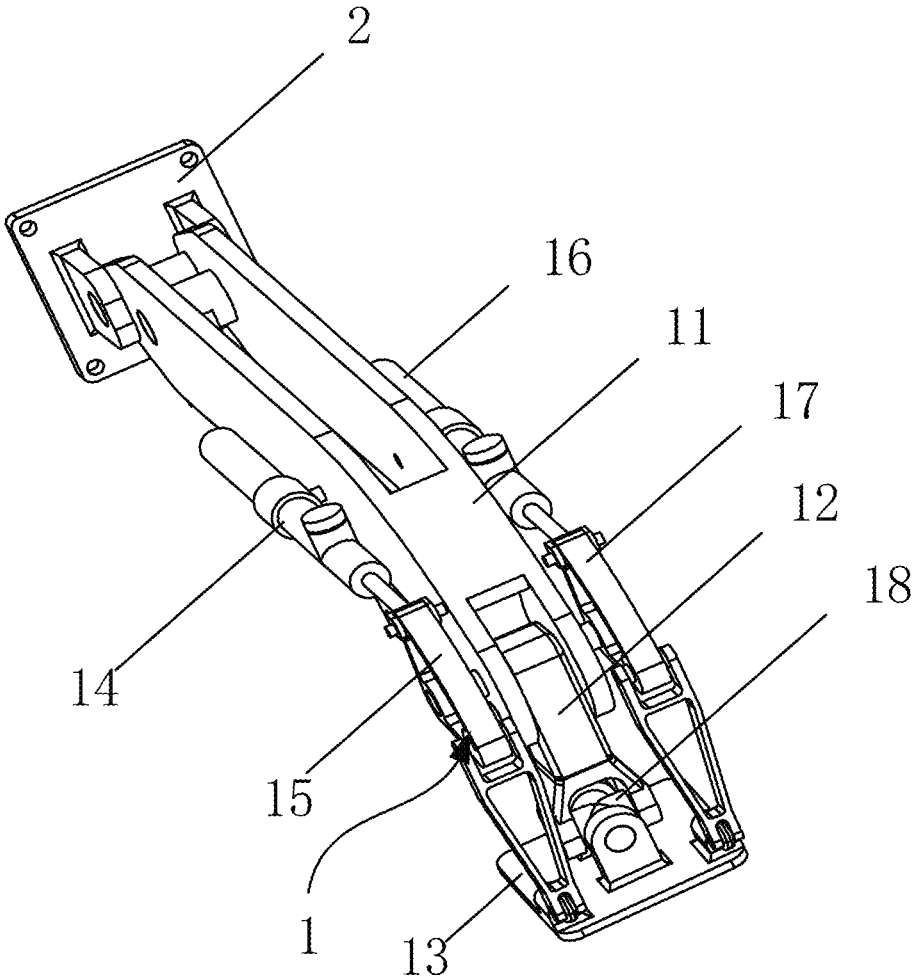
FIG. 2 is an axonometric view from a second perspective of the embodiment.
Figure 3:
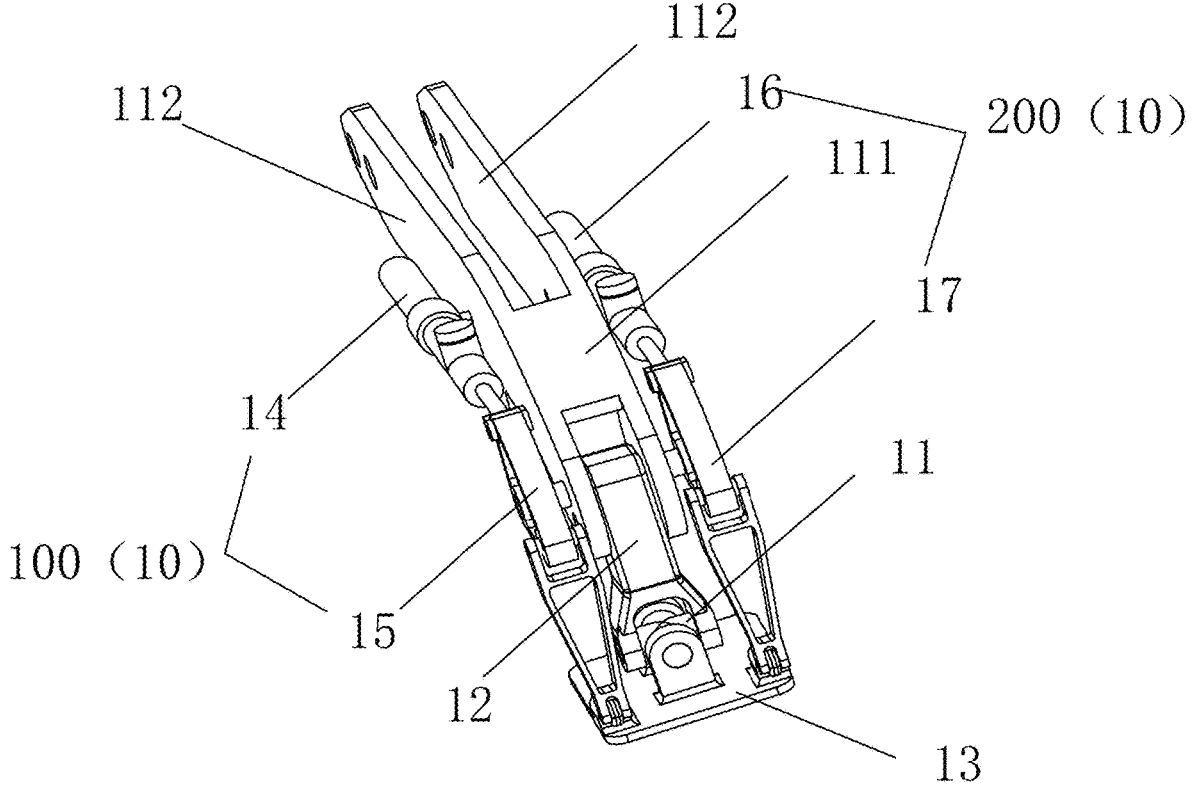
FIG. 3 is an axonometric view of a shock-absorption head in the embodiment.
Figure 4:
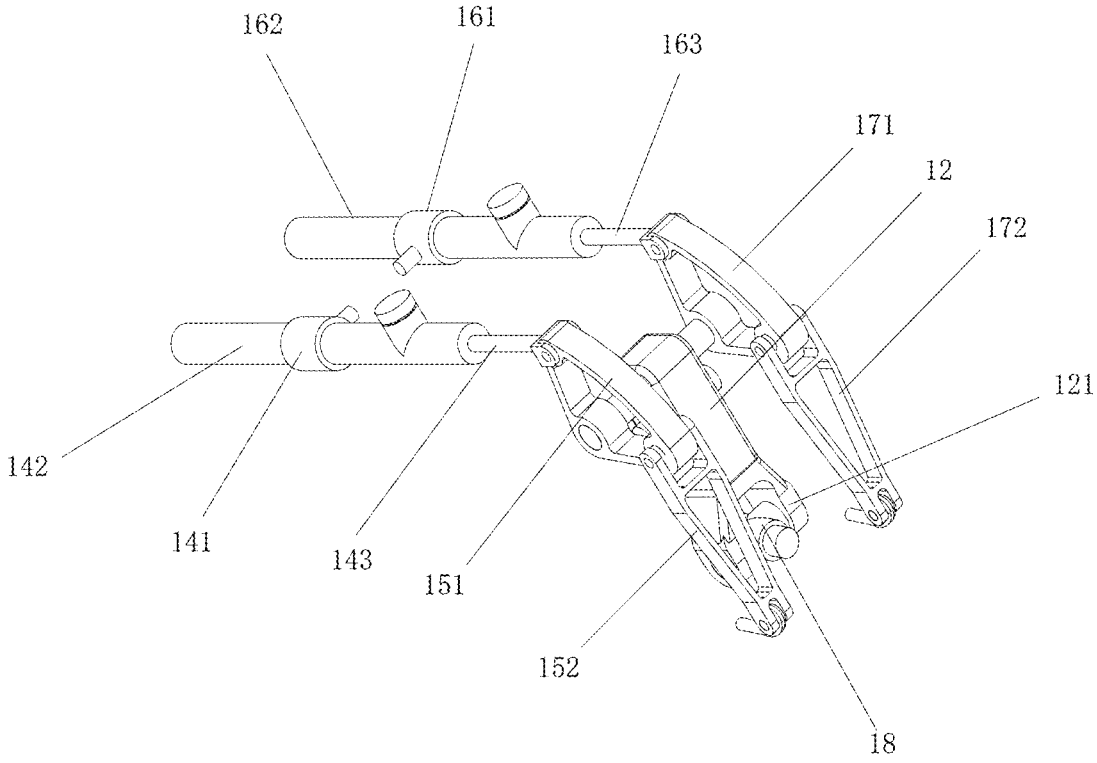
FIG. 4 is a schematic diagram of a combination state of a moving component, a cross-axis, a first shock-absorption component, a first transmission component, a second shock-absorption component, and a second transmission component in the embodiment.
Figure 5:
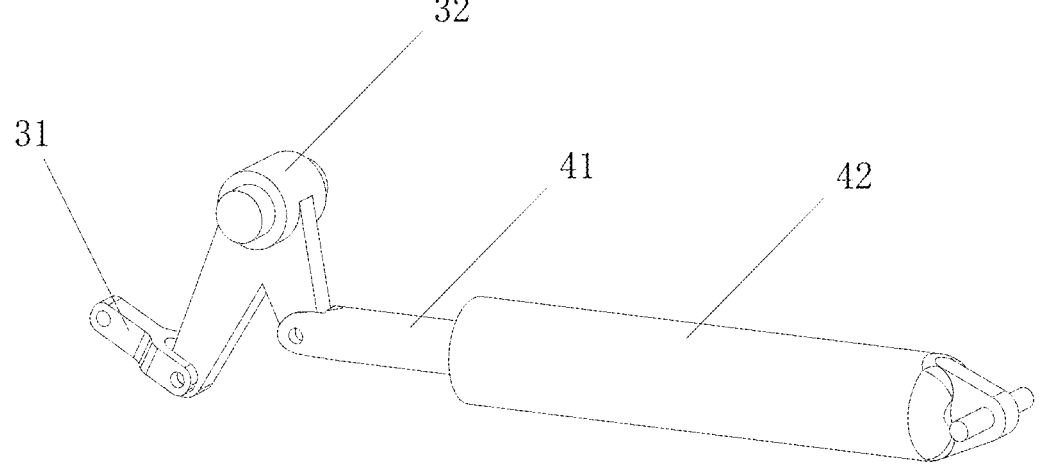
FIG. 5 is a schematic diagram of a combination state of a cushioning component and a damping component in the embodiment.
Figure 6:
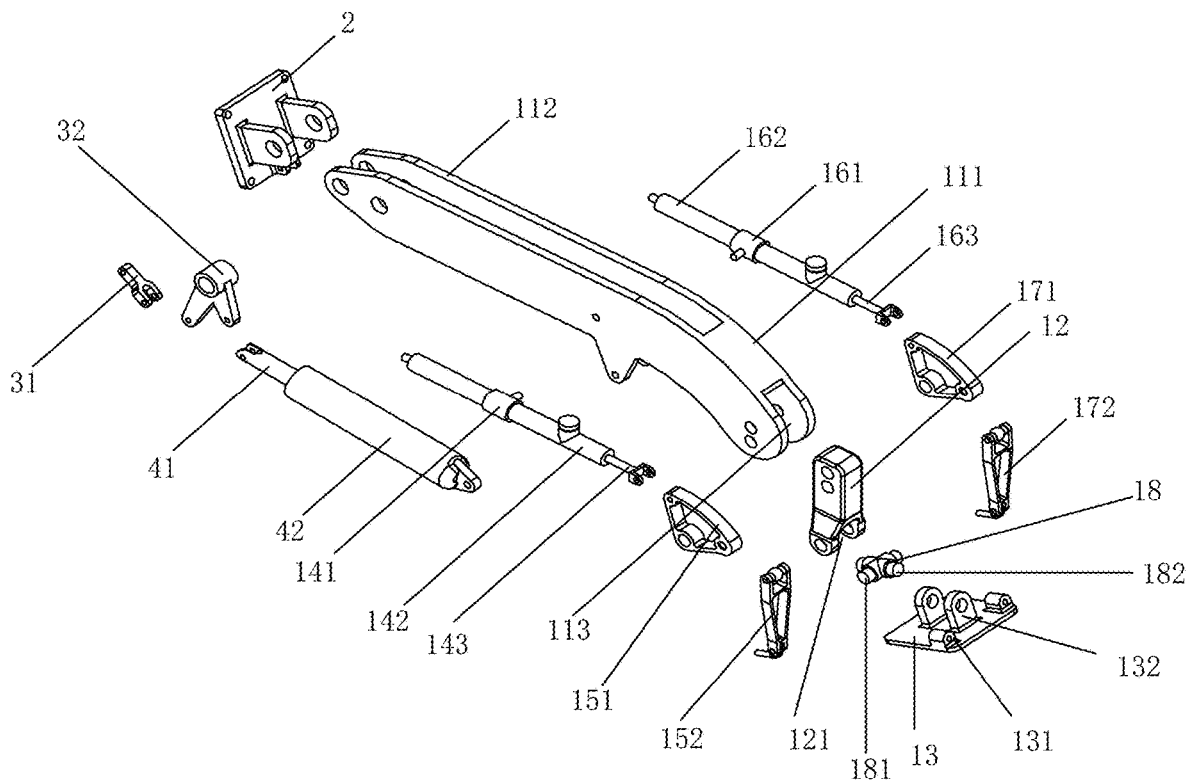
FIG. 6 is an exploded view of the shock-absorption mechanism of FIG. 1.

To fulfill the stated objectives, the technical solution of this embodiment is outlined as follows:

Referring to FIGS. 1-6, a shock-absorption mechanism includes a shock-absorption head 1. The shock-absorption head 1 includes a connector 11, a moving member 12, a supporting member 13, and a shock-absorption structure 10. The shock-absorption structure 10 is movably connected to the connector 11 and the moving member 12. One end (a first end) of the moving member 12 is linked to the connector 11 movably, while the other end (a second end) connects to the supporting member 13 movably. The shock-absorption structure 10 is attached to the supporting member 13 at the end distant from the connector 11.

Furthermore, the shock-absorption structure 10 is arranged in two groups: the first shock-absorption structure 100 and the second shock-absorption structure 200. The first shock-absorption structure 100 includes a first shock-absorption component 14 and a first transmission component 15. The first shock-absorption component 14 establishes a fixed connection with the connector 11 at one end (a first end) and a movable connection to the first transmission component 15 at the other end (a second end). The end of the first transmission component 15, opposite the first shock-absorption component 14, is movably connected to the supporting member 13. The end of the moving member 12, away from the supporting member 13, establishes a movable connection to the first transmission component 15. In this embodiment, the first shock-absorption component 14 and the first transmission component 15 collectively form the first shock-absorption structure 100. The second shock absorption component 16 and the second transmission component 17 collectively form the second shock-absorption structure 200. The first shock-absorption structure 100 and the second shock-absorption structure 200 are arranged on both sides of the connector 11, respectively. Consequently, the supporting member 13 can swing horizontally, buffering the camera's shaking at any angle and ensuring stable camera shots.

Furthermore, the first shock-absorption component 14 includes a first shock-absorption fixing part 141, a first shock-absorption guide sleeve 142, and a first telescopic part 143. The combination of the first shock-absorption fixing part 141 and the first shock-absorption guide sleeve 142 constitutes the first shock-absorption body. The first transmission component 15 includes a first rotating triangle piece 151 (first transmission member) and a first transmission rod 152 (second transmission member). The first shock-absorption guide sleeve 142 is securely attached to the side wall of the connector 11 through the first shock-absorption fixing part 141. The front end of the first telescopic part 143 is movably connected to the upper end of the first rotating triangle piece 151, with its terminus (the back end) arranged inside the first shock-absorption guide sleeve 142 movably. The lower end of the first rotating triangle piece 151 is pivotally connected to the upper end of the first transmission rod 152, and the lower end of the first transmission rod 152 is pivotally connected to the supporting member 13.

Furthermore, the second shock-absorption component 16 includes a second shock-absorption fixing part 161, a second shock-absorption guide sleeve 162, and a second telescopic part 163. The combination of the second shock-absorption fixing part 161 and the second shock-absorption guide sleeve 162 forms the second shock-absorption body. The second transmission component 17 includes a second rotating triangle piece 171 and a second transmission rod 172. The second shock-absorption guide sleeve 162 is securely attached to the side wall of the connector 11 through the second shock-absorption fixing part 161. The front end of the second telescopic part 163 is rotatably connected to the upper end of the second rotating triangle piece 171, with its terminus (the back end) movable inside the second shock-absorption guide sleeve 162. The lower end of the second rotating triangle piece 171 is pivotally connected to the upper end of the second transmission rod 172, and the lower end of the second transmission rod 172 is pivotally connected to the supporting member 13.

In this disclosure, both the first shock-absorption component 14 and the second shock-absorption component 16 can feature a damper, utilizing telescopic motion of the damper to achieve shock absorption.

Furthermore, the connector 11 includes a connecting arm 111. The connecting arm 111 possesses a moving position 113, where the upper end of the moving member 12 is pivotally connected. The first rotating triangle piece 151 and the second rotating triangle piece 171 are respectively positioned on opposite sides of the moving position 113. The side wall of the moving position 113, along with the first rotating triangle piece 151, the second rotating triangle piece 171, and the upper end of the moving member 12, are all coaxially connected. During the movement of the first shock-absorption component 14 and the second shock-absorption component 16, the moving member 12 can rotate synchronously with the first rotating triangle piece 151 and the second rotating triangle piece 171, driving the support component 13 to swing and enhancing the structural stability.

Furthermore, the shock-absorption head 1 incorporates a moving shaft (e.g. a cross-axle 18) The moving member 12 and the cross-axle 18 are clamped in the moving position 113 between the first transmission component 15 and the second transmission component 17. The lower end of the moving member 12 features a first rotation shaft seat 121, while the support component 13 is equipped with a second rotation shaft seat 131. Two mounting seats 132 are symmetrically positioned on both sides of the second rotation shaft seat 131, each equipped with a turning pin (pivot shaft). The lower ends of the first transmission rod 152 and the second transmission rod 172 are pivotally connected to the turning pins on the left and right sides, respectively. The cross-axle 18 includes a first shaft part 181 and a second shaft part 182, with the first shaft part 181 pivotally connected to the first rotation shaft seat 121, and the second shaft part 182 of the cross-axle 18 pivotally connected to the second rotation shaft seat 131.

In this embodiment, the supporting member 13 can accommodate equipment like cameras that necessitate shock absorption. The shock-absorption head 1 can securely attach to external structures such as a car rig via the connector 11. The first shock-absorption component 14 is adept at inducing controlled back-and-forth or left-and-right swings in the supporting member 13 via the first transmission component 15, while the second shock-absorption component 16 is adept at inducing controlled back-and-forth or left-and-right swings in the supporting member 13 via the second transmission component 17, equipped with rotational buffering and shock-absorption functions. The movable member 12 enables movable connections between the connecting arm 111 and the supporting member 13 via the cross-axle 18. This design ensures the structural stability and flexibility of the supporting member 13 while allowing unrestricted and undisturbed movement of it. Throughout the shooting process, when the camera undergoes horizontal shaking and inertial movement, the telescopic parts on the left and right sides of the connecting arm 111 can extend and retract within the damping guide sleeve. This enables self-telescopic motion to pull or push the transmission components, mitigating camera shaking. Retracting both structures will pull the transmission component backward, while extending both structures will push it forward. When extending or retracting simultaneously, both structures pull or push the transmission component, which drives the supporting member 13 to swing back and forth, buffering the centrifugal force caused by the camera's fore-and-aft movement. When the two structures stretch and contract alternately, they pull or push the transmission component alternately to drive the supporting member 13 to swing left and right, buffering the left-right centrifugal force caused by the camera's shaking. The supporting member 13's horizontal plane swings back and forth through the cooperation of pulling or pushing forces from both parts. This buffers camera shaking at any angle, ensuring stable camera shots. Consequently, the disclosure minimizes the risk of detachment between the camera and the shock-absorption arm 112, thereby preventing camera instability and ensuring the steadiness of the captured image.

Furthermore, in this embodiment, the shock-absorption mechanism includes a base 2, a cushioning component 3, and a damping component 4. The end of the shock-absorption arm 112 is pivotally connected in coaxial alignment to the base 2. Additionally, the end of the cushioning component 3 is pivotally connected to the base 2, with its front end pivotally connected to the end of the damping component 4. The front end of the damping component 4 is pivotally connected to the front end of the shock-absorption arm 112.

Furthermore, the connector 11 includes two shock-absorption arms 112, arranged side by side. The first shock-absorption fixing piece 141 and the second shock-absorption fixing piece 161 are securely connected to the outer sides of the two shock-absorption arms 112. The front ends of the shock-absorption arms 112 are linked to the tail ends of the connecting arm 111.

Furthermore, the cushioning component 3 includes a first connecting rod 31 and a second connecting rod 32. The damping component 4 includes a damping telescopic shaft 41 and a damping guide sleeve 42. The end of the first connecting rod 31 is pivotally connected to the base 2, with its front end pivotally connected to the end of the second connecting rod 32. The front end of the second connecting rod 32 is movably connected to the output end of the damping telescopic shaft 41. The damping telescopic shaft 41, away from one end of the second connecting rod 32, is movably arranged inside the damping guide sleeve 42. The damping guide sleeve 42, away from the damping telescopic shaft 41, is pivotally connected to the bottom of the front end of the damping arm 112. In this disclosure, the damping telescopic shaft 41 within the damping guide sleeve 42, coupled with the rotation of the buffer component 3, enables length adjustments for improved stability during the rotation of the shock-absorption arm 112. Specifically, when the shock-absorption arm 112 rotates up and down relative to the base 2, the damping telescopic shaft 41 can telescope to drive the second connecting rod 32 to rotate. This, in turn, drives the first connecting rod 31 to rotate through the second connecting rod 32, thereby adjusting the shaking and impact force caused by the rotation of the shock-absorption arm 112 and improving its stability. In this embodiment, the damping component 4 employs a damper (e.g., a shock absorber), applying the principles of the damper to achieve damping expansion and contraction, thereby buffering oscillation and impact forces.

Additionally, the folded structure of the second connecting rod 32, securely fixed to the shock-absorption arm 112, further enhances the overall stability of the structure by connecting the second connecting rod 32 with the shock-absorption arm 112.

It is essential to note that the above represents merely an exemplary embodiment of the present disclosure and should not serve to limit the scope of the disclosure. Any modifications, equivalent substitutions, and improvements made within the spirit and principles of the present disclosure shall be included in the protective scope of the present disclosure.

What is claimed is:

1. A shock-absorption head, comprising:
   a connector;
   a moving member;

a supporting member;

a shock-absorption structure movably connected to the connector and the moving member, wherein the shock-absorption structure comprises two shock-absorption structures respectively configured on opposite sides of the connector, and the two shock-absorption structures are configured to buffer left-right movement and fore-and-aft movement of the supporting member;

a first end of the moving member being movably connected to the connector, while a second end being movably connected to the supporting member; and an end of the shock-absorption structure away from the connector being movably connected to the supporting member.

2. The shock-absorption head according to claim 1, wherein the shock-absorption structure comprises a shock-absorption component and a transmission component;

the shock-absorption component comprises a first end affixed to the connector, and a second end movably linked to the transmission component;

an end of the transmission component, away from the shock-absorption component, establishes a movable connection with the supporting member; and an end of the moving member, away from the supporting member, establishes a movable connection with the transmission component.

3. The shock-absorption head according to claim 2, wherein the shock-absorption component comprises a shock-absorption body and a telescopic part;

the shock-absorption body is securely fixed on a side wall of the connector; and the telescopic part comprises a first end establishing a movable connection to the transmission component, and a second end being movably arranged within the shock-absorption body.

4. The shock-absorption head according to claim 3, wherein the transmission component comprises a first transmission member and a second transmission member;

a first end of the first transmission member being connected to a first end of the telescopic part, while a second end of the first transmission member being movably connected to a first end of the second transmission member;

a second end of the second transmission member being movably linked to the supporting member; and a midpoint of the first transmission member establishes a rotatable connection with both the moving member and the connector.

5. The shock-absorption head according to claim 1, further comprising a moving shaft, the moving shaft featuring a first shaft part and a second shaft part;

wherein the moving member is equipped with a first rotating shaft seat, and the supporting member comprises a second rotating shaft seat; and wherein the first shaft part is movably connected to the first rotating shaft seat, and the second shaft part is movably connected to the second rotating shaft seat.

6. The shock-absorption head according to claim 5, wherein the moving member and the moving shaft are located between the two shock-absorption structures.

7. The shock-absorption head according to claim 6, further comprising:

two mounting bases respectively arranged on a different side of the supporting member; and a plurality of pivot shafts being configured on the mounting bases, each of the plurality of pivot shafts being movably connected to a corresponding one of the two shock-absorption structures, with the second rotating shaft seat aligning along an axis between the two mounting bases.

8. The shock-absorption head according to claim 1, wherein the two shock-absorption structures are configured to extend or retract simultaneously to buffer the fore-and-aft movement of the supporting member, and wherein a first one of the two shock-absorption structures is configured to extend and a second one of the two shock-absorption structures is configured to retract, to buffer the left-right movement of the supporting member.

9. A shock-absorption mechanism, comprising:

a base, a cushioning component, a damping component, and the shock-absorption head according to claim 1;

the connector comprising a shock-absorption arm that is movably connected to the base;

the damping component, located on the shock-absorption arm, and the damping component being movably connected to the cushioning component; and an end of the cushioning component, away from the damping component, establishes a rotatable connection with the base.

10. The shock-absorption mechanism according to claim 9, wherein the cushioning component comprises a first connecting rod and a second connecting rod;

the damping component comprises a damping telescopic shaft and a damping guide sleeve;

the first connecting rod comprises a first end movably connected to the base, and a second end movably connected to a first end of the second connecting rod;

a second end of the second connecting rod establishes a movable connection with an output end of the damping telescopic shaft;

an end of the damping telescopic shaft away from the second connecting rod being configured within the damping guide sleeve; and an end of the damping guide sleeve away from the second connecting rod being connected to a bottom of an end of the shock-absorption arm.

11. A shock-absorption head, comprising:

a connector;

a moving member;

a supporting member;

a shock-absorption structure movably connected to the connector and the moving member;

a first end of the moving member being movably connected to the connector, while a second end being movably connected to the supporting member; and an end of the shock-absorption structure away from the connector being movably connected to the supporting member, wherein the shock-absorption structure comprises a shock-absorption component and a transmission component;

wherein the shock-absorption component comprises a first end affixed to the connector, and a second end movably linked to the transmission component;

wherein an end of the transmission component, away from the shock-absorption component, establishes a movable connection with the supporting member;

wherein an end of the moving member, away from the supporting member, establishes a movable connection with the transmission component;

wherein the connector comprises a connecting arm equipped with a moving position;

wherein the moving member is positioned at the moving position, while the transmission component is situated along a side wall of the moving position; and wherein the transmission component, the side wall of the moving position, and the moving member are all coaxially and movably interconnected. 5

\* \* \* \* \*